Jan. 10, 1933.  S. R. HOWARD  1,893,622
WEIGHING MACHINE
Filed Dec. 16, 1930   7 Sheets-Sheet 2

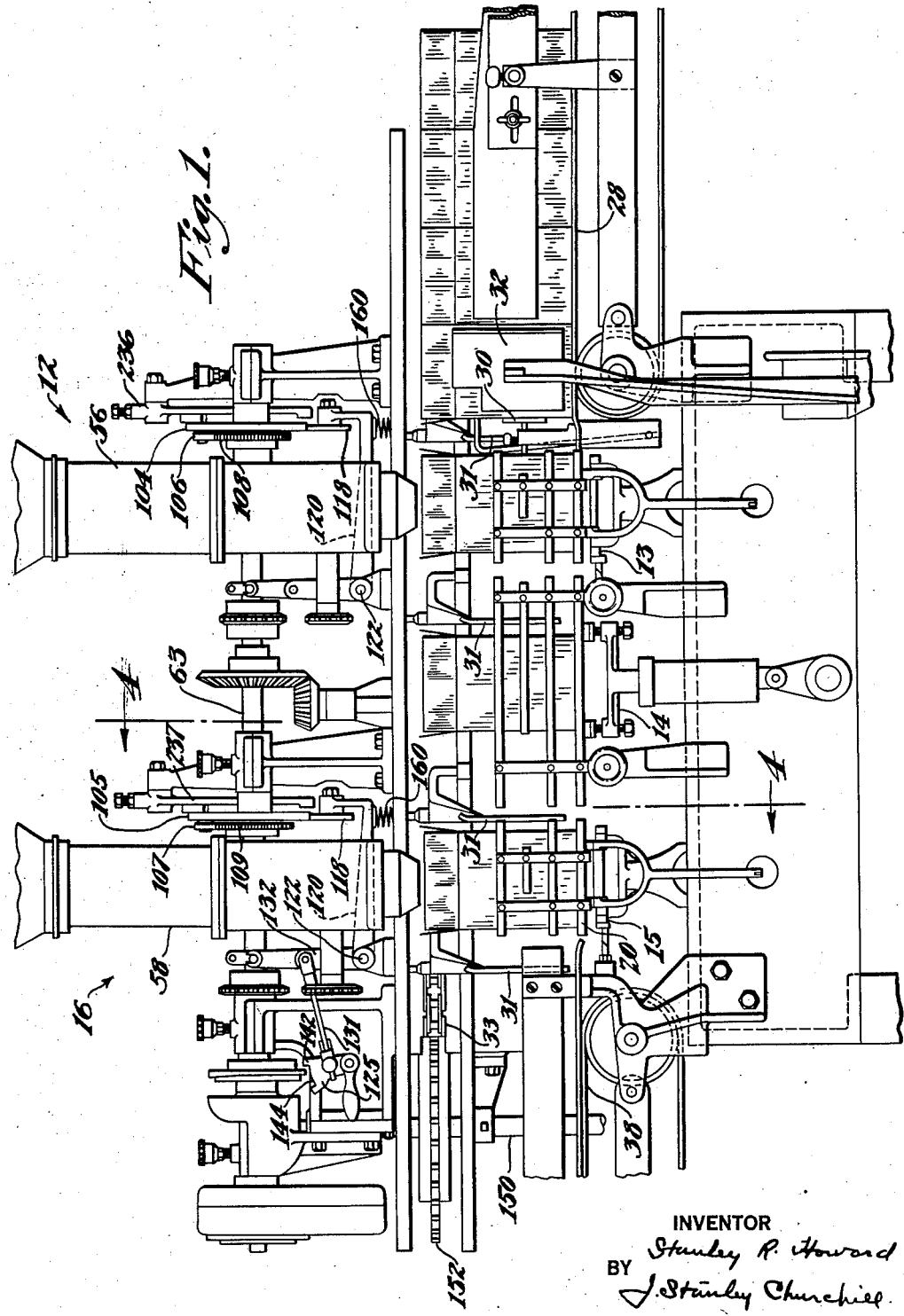

INVENTOR
Stanley R. Howard
BY
J. Stanley Churchill.
ATTORNEY

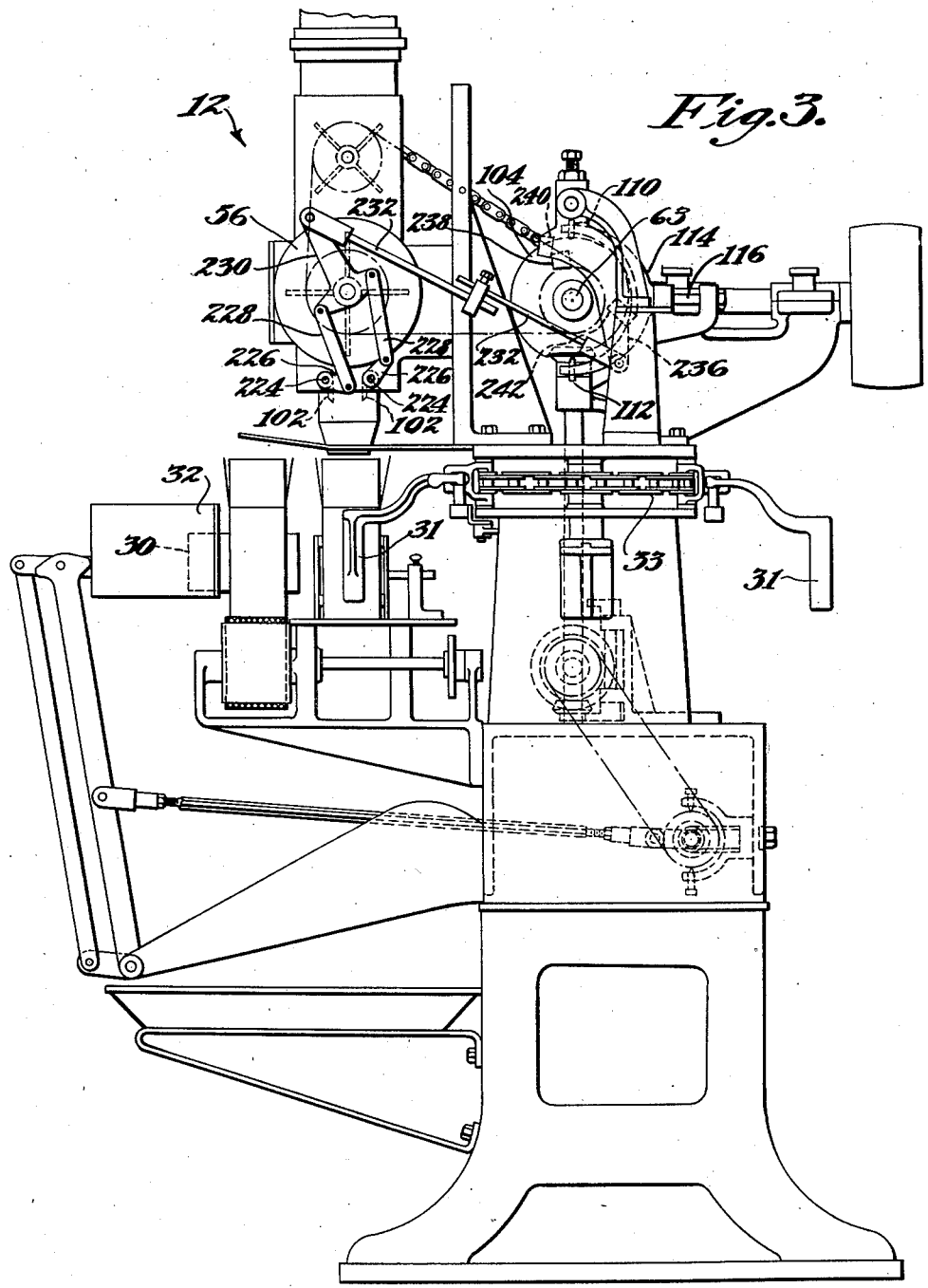

Jan. 10, 1933.   S. R. HOWARD   1,893,622
WEIGHING MACHINE
Filed Dec. 16, 1930   7 Sheets-Sheet 4

INVENTOR
Stanley R. Howard
BY J. Stanley Churchill
ATTORNEY

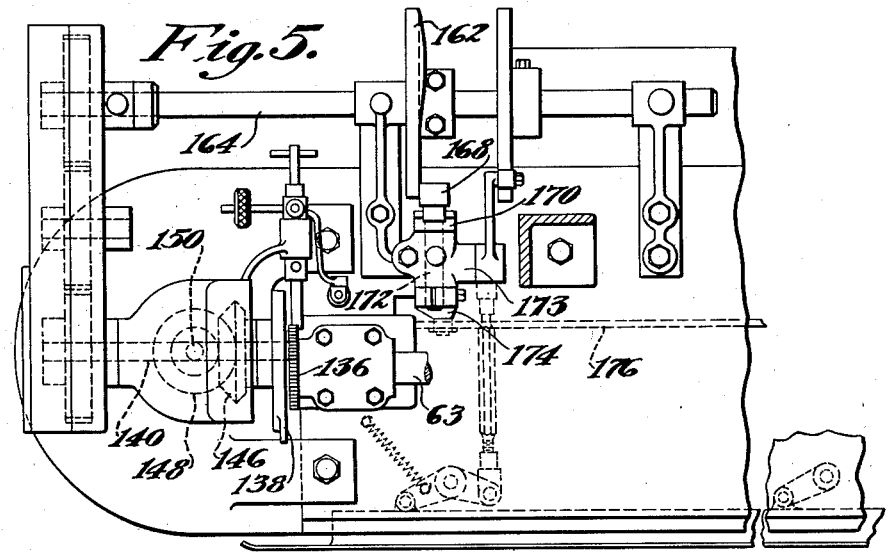
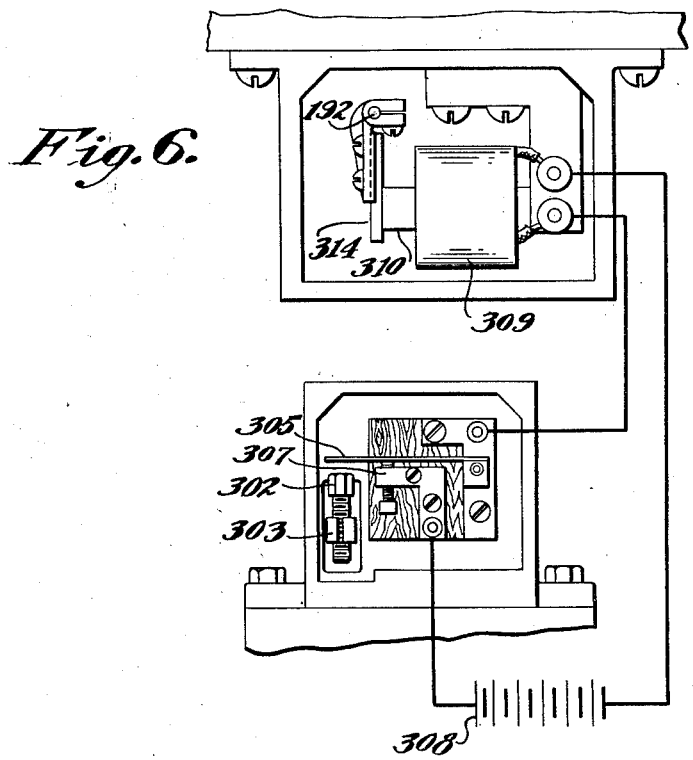

Jan. 10, 1933.    S. R. HOWARD    1,893,622
WEIGHING MACHINE
Filed Dec. 16, 1930    7 Sheets-Sheet 6

INVENTOR
Stanley R. Howard
BY J. Stanley Churchill
ATTORNEY

Jan. 10, 1933.    S. R. HOWARD    1,893,622
WEIGHING MACHINE
Filed Dec. 16, 1930    7 Sheets-Sheet 7

INVENTOR
Stanley R. Howard
BY
J. Stanley Churchill.
ATTORNEY

Patented Jan. 10, 1933

1,893,622

UNITED STATES PATENT OFFICE

STANLEY R. HOWARD, OF MILTON, MASSACHUSETTS, ASSIGNOR TO PNEUMATIC SCALE CORPORATION LIMITED, OF QUINCY, MASSACHUSETTS, A CORPORATION OF MASSACHUSETTS

WEIGHING MACHINE

Application filed December 16, 1930. Serial No. 502,683.

This invention relates to a weighing machine.

The object of the invention is to provide a novel and superior weighing machine in which provision is made for supporting and controlling the scale beam when the load has been nearly applied to the beam and the beam is about to balance, in a manner such as to reduce to a minimum the transmission of vibration to the beam to the end that maximum accuracy may be obtained in the weighing operation.

A further object of the invention is to provide a novel and superior weighing machine having a resilient beam engaging member arranged to be compressed by the beam when the latter is locked and which operates when nearly all of the load has been applied, to resiliently support the beam and prevent it from being oscillated by vibration which would otherwise be transmitted thereto to the end that maximum accuracy may be attained in the weighing operation.

A still further object of the invention is to provide a novel and superior weighing machine having provision for rigidly supporting the beam when the latter is locked, and for yieldingly supporting the beam when the beam is unlocked and nearly all of the load has been applied to the beam, to thereby prevent the beam from being oscillated by the vibration which would otherwise be transmitted thereto through said rigid beam support, to the end that maximum accuracy may be attained in the weighing operation.

With these objects in view and such others as may hereinafter appear, the invention consists in the weighing machine and in the structures, arrangements and combinations of parts hereinafter described and particularly defined in the claims at the end of this specification.

Figure 4:
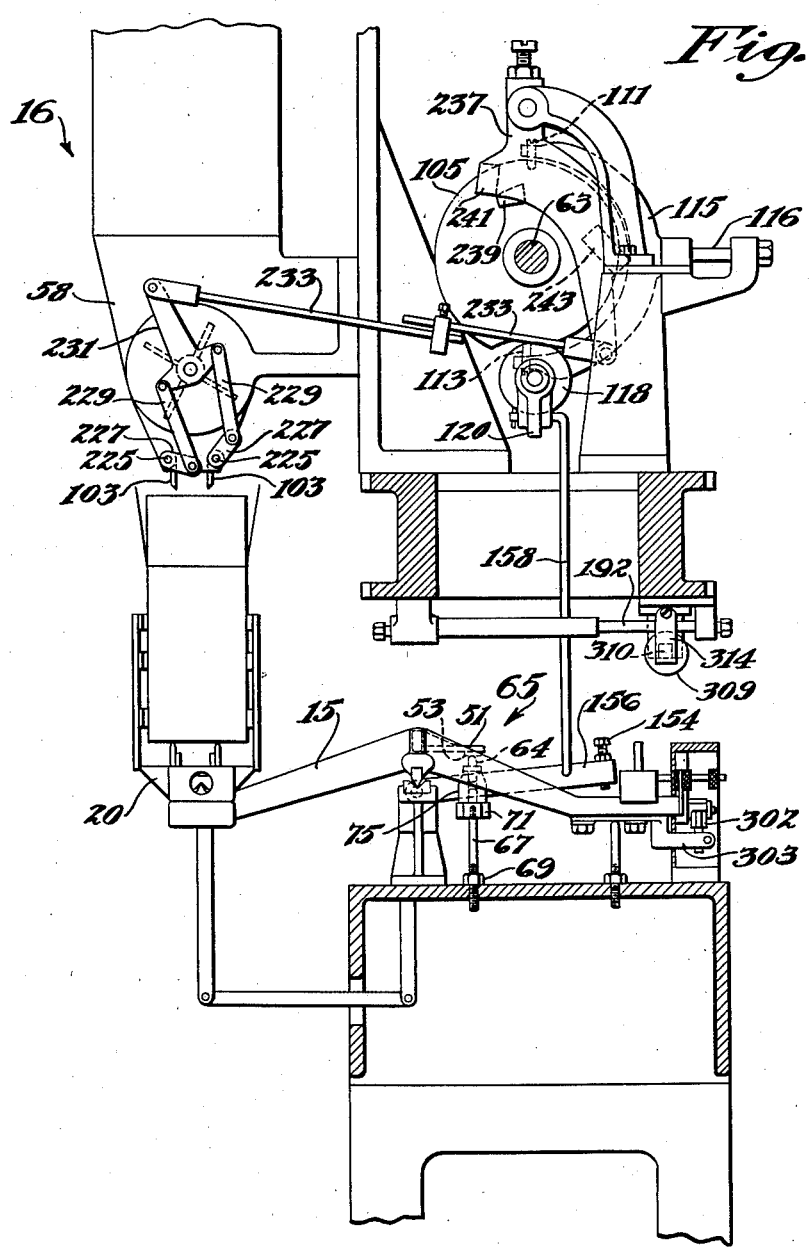
Figure 7:
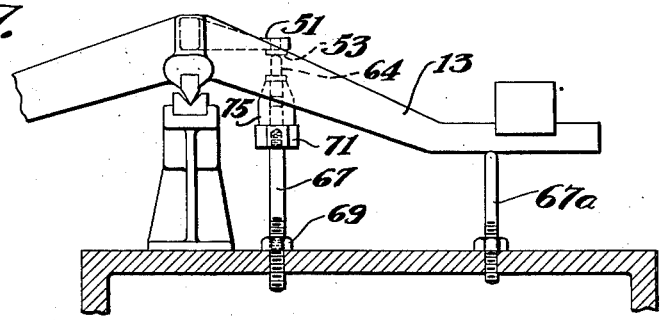
Figure 8:
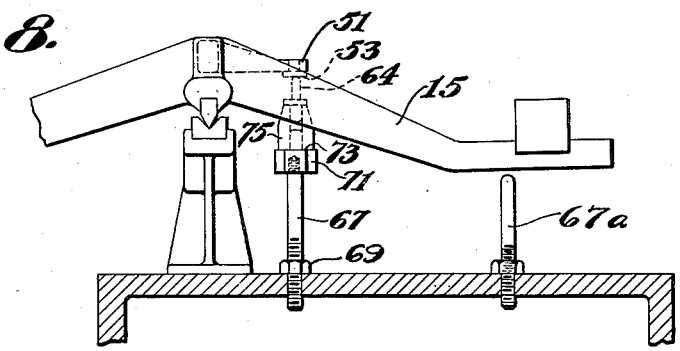
Figure 9:
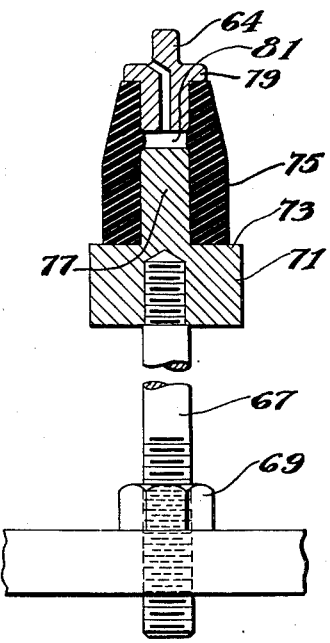
Figure 10:
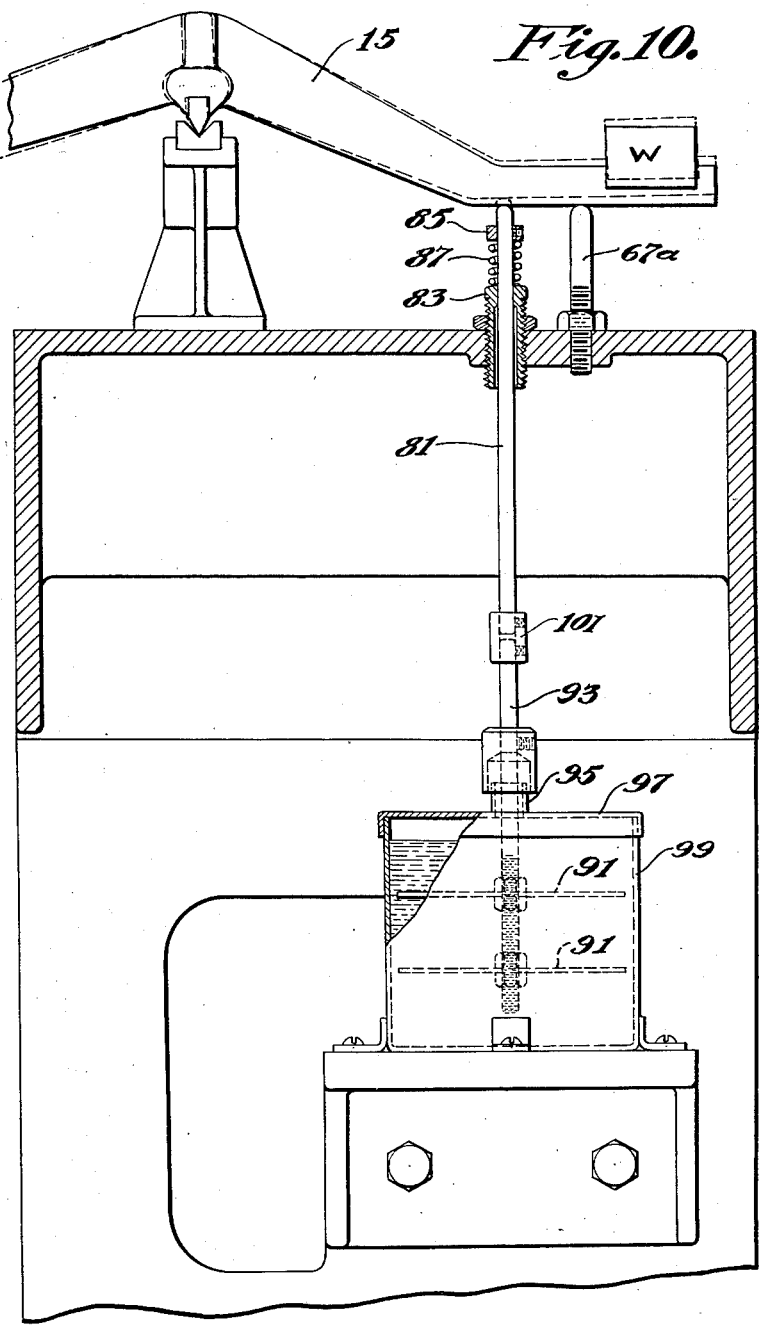

In the drawings illustrating the preferred embodiment of the invention. Fig. 1 is a front elevation of a weighing machine embodying the features of the present invention; Fig. 2 is a similar view with parts omitted; Fig. 3 is an end elevation of the machine; Fig. 4 is a vertical sectional view on the line 4—4 of Fig. 1; Fig. 5 is a sectional plan of the left-hand portion of the machine; Fig. 6 is a wiring diagram to be referred to; Figs. 7 and 8 are details in elevation of the scale beam and the scale supporting member; Fig. 9 is a vertical sectional detail of the scale supporting member; and Fig. 10 is a side elevation illustrating the scale beam with which is associated an alternative form of scale supporting member.

The conditions attending the use of commercial automatic weighing machines subject the machines to vibration both from an external source such as from other machinery in the building, and also from the vibration of the operating parts and mechanisms of the weighing machine itself in handling and feeding the material being weighed. In the operation of a weighing machine, as the material is fed onto the scale, a point is reached where the end of the scale beam is lifted a short distance from the steel supporting stud forming part of the usual scale locking mechanism by the weight of the material being deposited upon the weighing end of the beam. The beam then commences to oscillate slightly as more and more material is loaded onto the scale until a point is reached where the scale balances, indicating the correct weight. As above stated, when such a machine is used in practice, a vibration is oftentimes transmitted through the frame of the machine to the scale beam and particularly through the usual steel stud upon which the beam is locked, and if the period of the vibration is synchronous with the natural oscillations of the beam at the time when the weight is about to be reached, the effect of the vibration will be to cause the scale to reach a point of balance before it would have been brought into balance under the normal delivery of material onto the scale, with the result that an inaccurate weight is obtained.

In accordance with the present invention, provision is made for minimizing the effect of such vibration upon the beam, to the end that weights of maximum accuracy may be obtained, and to this end the weighing machine is provided with a yieldable beam supporting member arranged to support the beam in opposition to the unbalanced weight when nearly all of the load has been applied, to thereby reduce to a minimum the transmission of vibration to the beam during its movement into a position of balance. In the preferred embodiment of the invention, the weighing machine is provided with a yieldable beam support, preferably of rubber, mounted upon the scale platform, and of a height such as to be compressed when the beam is locked and when the beam is unlocked and nearly all of the load has been applied, to move the beam slightly from the usual rigid stud upon which the scale is locked, and to thereby form for the beam a yielding support of a character such as to reduce to a minimum the transmission of vibration to the beam, and thus avoiding the undesirable oscillations of the beam above referred to. While it is preferred to employ a rubber beam supporting member, in some instances desirable results may be secured using a spring and a dash pot connected therewith, as will be described.

Referring now to the drawings, for the purpose of illustration, the invention is illustrated as embodied in an automatic weighing machine of the type known in the art as a two-scale weigher and which in general may comprise the machine forming the subject matter of the patent to W. S. Scales No. 924,191, June 8, 1909, to which reference may be had for a complete description thereof. For the purposes of the present invention only sufficient portions of the complete weighing machine have been herein illustrated and will be described as appear to be necessary for a complete understanding of the invention. In general the machine illustrated in the drawings comprises a bulk loading mechanism 12 adapted to deliver into a carton positioned upon a scale beam 13 located immediately beneath it, a bulk load of the material, and provision is made, as will be described, for moving the carton after it has received its bulk load onto an intermediate platform which may be referred to as a tapping mechanism 14 which operates to shake down the bulk load to settle it in the carton, after which the carton is advanced to a scale beam 15 of the final loading mechanism. The final loading mechanism comprises in part a drip hopper 16 which delivers a stream of the material being weighed into the carton which has previously been supplied with the bulk load. When receiving the final load, the carton is positioned upon a scale pan 20 mounted upon the scale beam 15. The empty cartons are fed into the machine by a constantly driven inlet conveyor 28 until the lowermost carton thereon engages a fixed stop 30 and a pusher plate 32 is arranged to thereafter engage the first carton on the inlet conveyor and push it into positions where it may be engaged by a pusher arm 31 on an endless driven chain 33 and be moved beneath the bulk loading hopper and upon the scale beam 13. The pusher plate 32 is arranged to operate in timed relation to the series of pusher arms 31 on the conveyor chain 33 to intermittently feed the cartons in succession first to the bulk loading mechanism, then to the tapping mechanism 14, and then onto the scale pan 20 of the final loading mechanism. Finally after the carton has received its final load, it is discharged from the machine upon a discharge conveyor 38.

Referring now particularly to Figs. 7, 8 and 9, provision is made for reducing to a minimum any oscillatory movement of the scale beam during the period that the beam is about to make its weight, and in the preferred embodiment of the invention each scale beam 13, 15 is provided with an arm 51 having a contact member 53 adapted to rest upon the upper end of a post 64 forming a part of a scale controlling bumper indicated generally at 65 and which is secured to the supporting platform upon which the scale beams are mounted. Each scale controlling bumper 65 is preferably made, as illustrated in sectional detail in Fig. 9, comprising a post 67 threaded into the scale supporting platform and secured thereto to be capable of vertical adjustment, by a lock nut 69. The upper end of the post 67 is threaded and screwed into a block 71 having a flange 73 upon which the lower end of a compressible sleeve 75 rests. The sleeve 75 is preferably of rubber or other compressible resilient material. The sleeve 75 is fitted over a post 77 upstanding from the flange 73 and is also fitted over the lower end portion of the post 64. The upper end of the sleeve 75 abuts a flange 79 on the post 64 and the length of the sleeve 75 is such as to provide a space 81 between the posts 64 and 77 to thereby permit compression of the sleeve when the scale beam is locked against the usual rigid supporting stud 67a, as illustrated in Fig. 7. In the operation of the machine when the scale beam has been unlocked and nearly all of the load has been applied, the compression thus set up in the sleeve 75 operates to move the scale beam slightly from the rigid supporting stud 67a and to yieldingly support the remaining unbalanced weight upon the scale beam until the remainder of the load has been applied. In this manner the usual vibrations which have heretofore been transmitted to the scale beam through the rigid stud 67a are absorbed by the yielding scale supporting member, and as a result the scale beam is permitted to weigh with increased accuracy. The length of the scale controlling bumper 65 is preferably adjusted so that during the last part of the movement of the scale beam to a point of balance, the contact 53 will be free from the upper end of the post 64, leaving the scale free to reach its weight.

From the description thus far it will be seen that the effect of vibration in setting up oscillatory movements in the scale beams during the period in the operation of the machine following the unlocking of the scale beams, and during the movements of the beams up to nearly a point of balance, is reduced to a minimum and may in practice be practically eliminated. It will also be observed that the arms 51 are relatively short, thus reducing to a minimum the turning moment of the scale controlling bumper upon the scale beams and eliminating liability of inaccuracies in the weighing operation from this cause. In Fig. 10 I have illustrated an alternate form of scale controlling bumper for controlling the movements of each scale beam in a manner analogous to and for the same purpose that the scale controlling bumper illustrated in detail in Figs. 7, 8 and 9 is employed in the present machine. Referring to Fig. 10, as therein shown the scale controlling bumper includes a contact member adapted to engage the underside of the scale beam, which may comprise a rod 81 journalled in a bearing 83 screwed into the supporting platform upon which the scale beams are mounted. The rod is urged upwardly by a compression spring interposed between a collar 85 secured upon the rod and the top of the bearing 83. The compression spring 87 is of a length and is arranged to be slightly compressed when the scale beam is moved into the position indicated in full lines in Fig. 10 during the normal operation of locking the scale beam. When the scale beam is unlocked and starts to weigh, the compression set up in the coil spring 87 causes the rod 81 to lift the scale beam from the end of the usual rigid supporting stud 67a against which the scale is locked and to constitute a yielding support for the scale beam through which the usual vibrations are not transmitted to the beam and thus enabling the beam to weigh unaffected by such vibrations with the result of increased efficiency and accuracy in the weighing operation.

In order to insure the maintenance of uniformity and steadiness in the application of the yielding pressure exerted by the rod upon the scale beam, the lower end of the rod is preferably provided with a dash pot of any usual or preferred construction herein shown as being formed by a plurality of vanes 91 secured upon a rod 93 slidable vertically in a bearing 95 in the cover 97 of a dash pot 99, the dash pot containing l'quid as illustrated. The rod is connected by a coupling 101 to the lower end of the rod 81. With this construction the compression in the coil spring 87 is caused to be exerted in a steady and uniform manner upon the scale beam operating to reduce to a minimum the tendency of the scale beam to oscillate under vibration during its initial movements in performing the weighing operation.

As above stated, in general the construction of the illustrated weighing machine comprises that of the known automatic weighing machine commonly referred to as a two-scale weigher, such as is illustrated in the patent to Scales No. 924,191 above referred to. For an understanding of the operation of such weighing machine, it may be stated that the weighing machine operates in successive cycles. During the first part of each cycle in the operation of the machine, the loading, tapping and weighing operations described take place. After the cartons on the scale pans have received their weights, the second part of the cycle is permitted to begin and the feed mechanisms are actuated to advance a carton to the position previously occupied by the preceding one. In other words, a fresh carton is fed into position under the bulk loading mechanism and the carton with its bulk load is fed onto the final weight scale beam and the completely weighed carton is fed onto the discharge conveyor to be discharged from the machine.

The loading and weighing mechanisms used in the illustrated weighing machine will now be described. The bulk loading mechanism, as illustrated in Figs. 1 and 3, operates during the first half of each cycle to deliver a bulk load into the carton positioned upon the scale beam 13. The bulk loading mechanism includes a hopper 56 provided on its lower end with a pair of shutters 102 as shown in Fig. 3, by means of which the flow of material from the hopper is controlled through connections which will be described from the control shaft 63. To this end a cam member 104 is loosely mounted on the shaft 63 and a pawl 106 pivoted on said cam member is normally urged by a spring, not shown, into engagement with a ratchet 108 secured to said control shaft 63, as shown in Fig. 1. The pawl and ratchet 108 comprise a clutch for driving the cam 104 controlling the operation of the gate members or shutters 102 by which the flow of material from the bulk loading hopper 56 is controlled. The pawl 106 is disengaged from the teeth of its ratchet 108 by either of two pins 110, 112, mounted in a yoke 114, the yoke being pivoted upon a shaft 116 secured in a suitable bracket forming a part of the machine frame. The yoke 114 is oscillated, as will be described, in a direction longitudinally of the control shaft 63 to present either the upper or lower pin 110, 112 upon the yoke 114 in the path of the pawl 106 of the pawl and ratchet clutch. When the yoke is rocked counter-clockwise, viewing Fig. 2, to move the upper pin 110 out of the path of the pawl 106, the spring above referred to operates to cause the nose of the pawl 106 to engage the teeth of its ratchet 108 and the ratchet operates to drive, through the pawl 106, the cam disk 104 through one-half a revolution. When the yoke 114 is rocked, as above described, the lower pin 112 of the yoke is positioned in the path of the pawl 106 so that at the end of the half revolution of the cam disk 104, the pawl 106 is disengaged from its ratchet 108 and remains disengaged until the lower pin 112 is again moved out of the path of the pawl when the yoke is rocked in the reverse direction, as will be described.

The usual provision is also preferably made for controlling the machine so that it will not start on the second part of its cycle of operation. When the yoke 114 is rocked in a clockwise direction, viewing Fig. 2, at the completion of the carton feeding operation, as will be described, and the cam disk 104 is thereby permitted to rotate through one-half a revolution, an abutment 238 on the face of the cam disk engages an abutment 240 formed on a rock lever 236 and rocks said lever in a clockwise direction, viewing Fig. 3, to move the shutter 102 into its open position and permit material to be discharged from the hopper 56 into the carton upon the scale beam 13. The connection between the rock lever 236 and the shutter is best illustrated in Fig. 3, and includes a pair of rock shafts 224 journalled in the hopper, arms 226 secured to the shafts 224, links 228, a rock lever 230, and links 232.

When the scale has made its weight, the yoke 114 is rocked in a counter-clockwise direction and the cam disk 104 is permitted to rotate through another half revolution during which the abutment 238 on the disk engages an abutment 242 on the adjacent rock lever 236 and rocks said lever in a counter-clockwise direction, viewing Fig. 3, to thereby close the shutters 102 through the connections described.

The final loading mechanism includes a hopper 58 and the mechanism for controlling the flow of material from the hopper may and preferably will comprise a duplication of the mechanism just described in connection with the bulk loading mechanism and includes, as will be apparent from an inspection of Figs. 1 and 4, a pair of shutters 103, a cam member 105 loosely mounted on the control shaft 63, a pawl 107 pivoted on the cam member arranged to cooperate with a ratchet 109 secured to the control shaft. The pawl is disengaged from the teeth of its ratchet 109 by either of two pins 111, 113, mounted in a yoke 115. When the cam disk 105 is permitted to rotate through one-half a revolution, an abutment 239 engages an abutment 241 on a rock lever 237 and operates to move the shutter 103 into open position. The rock lever 237 is connected with the shutter by a connection including rock shafts 225, arms 227, links 229, a rock lever 231, and links 233. When the scale has made its weight, the yoke 115 is rocked in a counter-clockwise direction and the cam disk 105 is permitted to rotate through another half a revolution during which the abutment 239 on the disk engages an abutment 243 on a rock lever 237 and rocks the lever in a counter-clockwise direction to thereby close the shutters 103 through the connections described.

The usual provision is made for controlling the machine so that it will not start on the second half of its cycle of operations until both scales have completed their weights. For this purpose, each cam disk 104, 105 has cooperating with it a cam roller 118 on the end of an arm 120 pivoted upon a rock shaft 122. Each arm 120 is directly connected to a pawl controlling latch 124, 125, one of the arms 120 being connected to the latch 124 by a link 126, arm 128 and link 130, and the other to the second latch 125 which is directly behind the latch 124 shown in Fig. 2 by an arm 132 and similar link 131. Both pawl controlling latches 124, 125 are arranged to cooperate with a pawl 134 of a pawl and ratchet clutch, the ratchet 136 being fast on the shaft 63, and the pawl 134 being mounted on a pawl carrying disk 138 secured to a separate shaft 140 which is arranged to be driven from the shaft 63 through the pawl and ratchet clutch 134, 136. The pawl controlling latches 124, 125 are each provided with a pawl engaging portion 142 for holding the pawl out of engagement with the ratchet and with a recessed portion 144 adapted to permit the free rotation of the pawl without disengagement from the ratchet. When both pawl engaging latches are swung to the right from the position shown in Fig. 2, the pawl 134 is permitted to engage the ratchet 136 and drive the shaft 140, Fig. 5. The latter is connected by beveled gears 146, 148 with a vertical shaft 150 upon which is mounted the sprocket 152 for driving the conveyor chain 33, and consequently the movements of the cartons at the start of the second part of each cycle cannot take place unless the pawl controlling latches 124, 125 are in their inoperative position, or in other words are swung to the right from the position shown in Fig. 2 to permit the pawl 134 to engage the ratchet 136. This condition, as will be described, only obtains when both scale beams have completed their weights and have been reset.

During the portion of each cycle in the operation of the machine in which the cartons are being moved onto the scale pans, the scale beams are locked by set screws 154 on levers 156, the latter being held down by the cams 104, 105 through the rollers 118, arms 120, and links 158. After the cartons have been positioned, the set screws 154 and levers 156 are raised by springs 160 under the arms 120 to unlock the scale beams preparatory to the start of the weighing operation.

The yokes 114, 115 are rocked in a clockwise direction by mechanism including a cam 162 on a counter shaft 164 geared to the shaft 140. The cam roller 168 is arranged to cooperate with the cam 162 and is mounted upon the upper arm of a lever 170 secured to a rock shaft 172 journalled in a bracket 173. The lever 174 is also secured to the rock shaft 172 and is pivotally secured at its lower end to a slide bar 176 having two pins 178, 180 projecting therefrom. The pins 178, 180 are adapted when the slide bar is moved in the direction of the arrow (Fig. 2) by the cam 162, to engage levers 186, 188 secured to rock shafts 192, 194 and rock said shafts in a clockwise direction. The levers 198 also secured to the rock shafts 192, 194 are connected by links 204 to the yokes 114, 115. The movement of the yokes 114, 115 in a clockwise direction is effected by the cam 162 but the movement is controlled in the manner above described so that it is not permitted to take place during the previous half cycle of operation.

When the scales have made their weights the scale beams are depressed and provision is made for operatively connecting each scale beam with the corresponding yoke 114, 115 through any usual or preferred form of scale resetting mechanism and which is herein illustrated as including an electro-magnetic device for accomplishing this purpose. When each scale beam makes its weight, a contact member 302 carried by an arm 303 bolted to the underside of the scale beam, as shown in Fig. 4, is brought up against and raises a spring contact 305 operating to break an electrical circuit at the contacts 305, 307. The electrical circuit includes a battery 308 and an electromagnet 309, the core 310 of which is arranged to cooperate with a latch member 314 secured upon and depending from an operating shaft 192 or 194. The operating shaft 192 or 194 has connected to it a spring 319 which tends to rock the shaft 192 or 194 in a direction to pull the latch 314 from the core of the magnet. When, therefore, the scale beam makes its weight and the electrical circuit is broken at the contacts 305, 307, the latch member 314 is released, permitting the shaft 192 or 194 to be rocked by the spring 319 and this movement of the shaft is transmitted in the manner now usually practiced, through the linkage connection 204, to the particular yoke 114, 115.

The form of scale controlling bumper illustrated in Fig. 10 is particularly useful in that the control of the scale beam is effective through the cooperate action of the compression spring 87 and the dash pot 99 in a manner such that the spring is prevented from raising the scale beam quickly as the scale approaches a point of balance. The pressure exerted by the spring throughout the relatively small distance of movement of the scale beam is uniform and the effect of the dash pot serves to prevent the sudden application of a force to the scale beam.

While the invention has been illustrated and described in connection with a two scale weigher, it is to be understood that the invention may be embodied in other forms of weighing machines, and further, while the invention has been illustrated and described as embodied in a yieldable scale controlling bumper, it is to be understood that it may be embodied in other forms of mechanism for performing the described function.

Having thus described the invention, what is claimed is:—

1. In a weighing machine, in combination, a scale beam, load applying means, and a controlling device cooperating with the beam to form its sole support during a sufficient part of the weighing operation to prevent motion being imparted to the beam by extraneous vibration until the time when the load being applied to the beam substantially reaches that required to balance the beam to thereby reduce to a minimum the transmission of vibration to the beam at such time.

2. In a weighing machine, in combination, a scale beam, load applying means, and a resilient device cooperating continuously with the beam to form a support therefor until the time when the load being applied to the beam substantially reaches that required to balance the beam to thereby reduce to a minimum the transmission of vibration to the beam at such time.

3. In a weighing machine, in combination, a scale beam, load applying means, scale locking mechanism including a rigid supporting member upon which the weight end of the beam is rested when the scale is locked, and yieldable means for moving and supporting the beam when the load being applied to the beam approaches that required to balance the beam to thereby reduce to a minimum the transmission of vibration to the beam at such a time.

4. In a weighing machine, in combination, a scale beam, scale locking mechanism including a supporting member upon which the weight end of the beam is rested when the scale is locked, and a scale controlling member cooperating with the scale beam and arranged to be compressed by the scale beam when the latter is moved into its locked position.

5. In a weighing machine, in combination, a scale beam, and a rubber bumper cooperating with the scale beam to be maintained by it under compression during the initial weighing movement of the scale beam and during a sufficient part of the weighing operation to prevent motion being imparted to the beam by extraneous vibration until the beam has substantially reached a point of balance.

6. In a weighing machine, in combination, a scale beam, scale locking means, a contact member secured thereto to move therewith, and a compressible member adapted to be engaged and compressed by said contact member when the scale beam is locked and to exert a yielding pressure on the beam during its initial weighing movements.

7. In a weighing machine, in combination, a scale beam, and a compressible member for controlling the scale beam for the purpose specified, comprising two non-compressible members and an interposed compressible member.

8. In a weighing machine, in combination, a scale beam, and a compressible member for controlling the scale beam for the purpose specified, comprising two non-compressible members and a compressible rubber sleeve interposed between said non-compressible members.

9. In a weighing machine, in combination, a scale beam, scale locking means, load applying means, and a yieldable scale controlling member arranged to be energized when the scale beam is locked, and to exert a force on the beam when the latter is unlocked for the purpose specified and during the weighing movement of the beam.

10. In a weighing machine, in combination, load applying means, a scale beam, scale locking means, and a yieldable scale controlling member arranged to be energized when the scale beam is locked, and to exert a force on the beam when the latter is unlocked for the purpose specified and during the weighing movement of the beam, and a dash pot connected with said member.

11. In a weighing machine, in combination, load applying means, a scale beam, scale locking means, a rigid support on which the scale beam rests when the beam is locked, an elongated rod cooperating with the scale beam, a spring adapted to be compressed when the scale beam is locked for urging the rod to a position to move the scale beam from the rigid supporting member, and a dash pot to the movable member of which said rod is connected.

12. In a weighing machine, in combination, load applying means, a scale beam, scale locking means, a spring, means for connecting the spring and the scale beam to permit compression of the spring when the scale beam is locked, and a dash pot connected to the spring for rendering the application of the yielding pressure of the spring to the scale beam uniform.

In testimony whereof I have signed my name to this specification.

STANLEY R. HOWARD.